United States Patent
Nishikawa

(10) Patent No.: US 10,079,020 B2
(45) Date of Patent: Sep. 18, 2018

(54) SPEECH RECOGNITION METHOD AND SPEECH RECOGNITION APPARATUS TO IMPROVE PERFORMANCE OR RESPONSE OF SPEECH RECOGNITION

(71) Applicant: Panasonic Corporation, Osaka (JP)

(72) Inventor: Tsuyoki Nishikawa, Osaka (JP)

(73) Assignee: PANASONIC CORPORATION, Osaka (JP)

( * ) Notice: Subject to any disclaimer, the term of this patent is extended or adjusted under 35 U.S.C. 154(b) by 0 days.

(21) Appl. No.: 15/344,653

(22) Filed: Nov. 7, 2016

(65) Prior Publication Data
US 2017/0148442 A1 May 25, 2017

Related U.S. Application Data

(60) Provisional application No. 62/257,368, filed on Nov. 19, 2015.

(30) Foreign Application Priority Data

Aug. 1, 2016 (JP) ................. 2016-151383

(51) Int. Cl.
*G10L 15/26* (2006.01)
*G10L 15/28* (2013.01)
*G10L 25/78* (2013.01)
*G10L 21/0232* (2013.01)

(52) U.S. Cl.
CPC ........ *G10L 15/285* (2013.01); *G10L 21/0232* (2013.01); *G10L 25/78* (2013.01); *G10L 2025/783* (2013.01)

(58) Field of Classification Search
CPC ....................................................... G10L 15/20
See application file for complete search history.

(56) References Cited

U.S. PATENT DOCUMENTS

| | | | | |
|---|---|---|---|---|
| 9,514,747 B1* | 12/2016 | Bisani | ..................... | G10L 25/60 |
| 2006/0053009 A1 | 3/2006 | Jeong et al. | | |
| 2009/0012790 A1* | 1/2009 | Yamada | ................ | G10L 15/065 |
| | | | | 704/251 |
| 2010/0318358 A1* | 12/2010 | Onishi | .................... | G10L 15/08 |
| | | | | 704/255 |

FOREIGN PATENT DOCUMENTS

| | | |
|---|---|---|
| JP | 59-195298 | 11/1984 |
| WO | 2002/093555 | 11/2002 |

OTHER PUBLICATIONS

The Extended European Search Report, dated Dec. 23, 2016, from the European Patent Office (EPO) for the related European Patent Application No. 16198319.2.

* cited by examiner

*Primary Examiner* — Shreyans Patel
(74) *Attorney, Agent, or Firm* — Greenblum & Bernstein, P.L.C.

(57) ABSTRACT

In a speech recognition method, a criteria value is determined to determine the length of a silent section included in a processing section, and a processing mode to use is determined in accordance with the criteria value. The criteria value is used to obtain audio information of the processing section. Audio processing is executed on the audio information in the processing section, using the processing mode that has been determined. Speech recognition processing is executed on the audio information in the processing section that has been subjected to audio processing.

12 Claims, 14 Drawing Sheets

SPEECH RECOGNITION METHOD AND SPEECH RECOGNITION APPARATUS TO IMPROVE PERFORMANCE OR RESPONSE OF SPEECH RECOGNITION

BACKGROUND

1. Technical Field

The present disclosure relates to a speech recognition method and speech recognition apparatus to particularly improve performance or response of speech recognition.

2. Description of the Related Art

In conventional speech recognition, audio processing such as encoding, noise removal, and so forth is performed as pre-processing for speech recognition. In doing so, audio data has been processed in increments of frames. In a case of real-time processing, processing of a preceding frame has to be finished before starting the next frame. An example of conventional speech recognition is described in Japanese Unexamined Patent Application Publication No. 59-195298.

When implementing such audio processing in a chip with limited processing resources, there is a tradeoff between improvement in speech recognition performance and improvement in response of speech recognition.

SUMMARY

One non-limiting and exemplary embodiment provides a speech recognition method and speech recognition apparatus that can suitably adjust performance and response of speech recognition.

In one general aspect, the techniques disclosed here feature a speech recognition method including: determining of a criteria value to determine a length of a first silent section included in a processing section; determining of a processing mode to be used out of multiple processing modes for audio processing of which the processing amounts differ from each other, in accordance with the criteria value; obtaining of audio information in a processing section including a section of interest and the first silent section following the section of interest, out of audio information in an input section including the processing section, using the criteria value; executing of audio processing on the audio information in the section of interest, out of the audio information in the processing section, using the processing mode that has been determined; and executing of speech recognition processing on the audio information in the section of the interest where the audio processing has been performed.

According to the present disclosure, a speech recognition method and speech recognition apparatus that can suitably adjust performance and response of speech recognition can be provided.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Underlying Knowledge Forming Basis of the Present Disclosure

Figure 1:
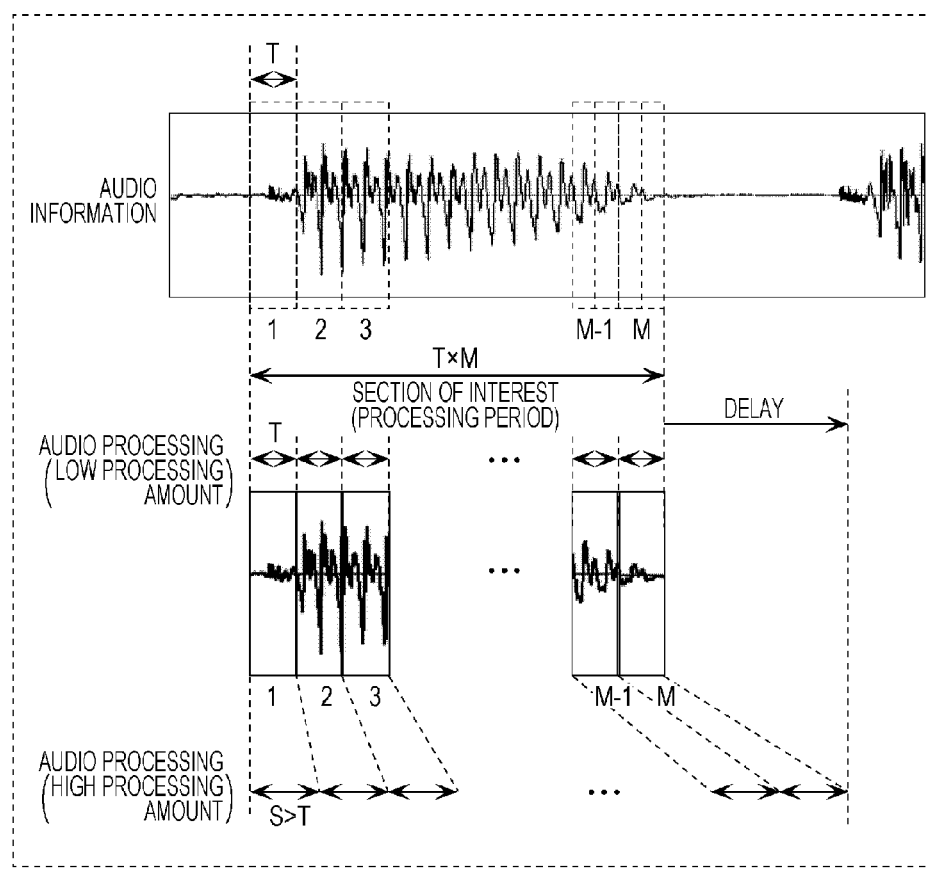
FIG. 1 is a diagram for describing speech processing.

First, problems that occur in a case where speech recognition processing is performed using audio information after audio processing will be described with reference to FIG. 1. Audio processing on is performed on audio information in increments of frames that have a predetermined period T, as illustrated in FIG. 1. For example, in a case of processing M frames as illustrated in FIG. 1, processing needs to be performed within the processing period of these M frames (T×M) in order to improve the response of speech recognition. That is to say, each frame needs to be processed within time T.

On the other hand, if speech processing (e.g., noise removal processing) with high performance (e.g., high processing load) is used to improve the performance of speech recognition, the processing time of each frame is S>T, and the amount of time required to process M frames is S×M. Accordingly, a delay occurs at the start of speech recognition processing, and consequently the response of speech recognition deteriorates.

Thus, there have been the following problems. If priority is given to improved performance of speech recognition, high-performance audio processing needs to be performed as pre-processing, so an audio processing algorithm that has a high processing load will be used. As a result, the processing speed is slower, and response of speech recognition lags. On the other hand, if priority is given to improved response in speech recognition, an audio processing algorithm that has a high processing load cannot be used, and high-performance audio processing cannot be performed as pre-processing. As a result, performance of speech recognition suffers.

A speech recognition method according to an aspect of the present disclosure includes: determining of a criteria value to determine a length of a first silent section included in a processing section; determining of a processing mode to be used out of multiple processing modes for audio processing of which the processing amounts differ from each other, in accordance with the criteria value; obtaining of audio information in a processing section including a section of interest and the first silent section following the section of interest, out of audio information in an input section including the processing section, using the criteria value; executing of audio processing on the audio information in the section of interest, out of the audio information in the processing section, using the processing mode that has been determined; and executing of speech recognition processing on the audio information in the section of the interest where the audio processing has been performed.

According to this configuration, changing the processing mode in accordance with the length of the first silent section enables a processing mode to be selected taking into consideration performing audio processing on audio information in the section of interest using the first silent section. Accordingly, speech recognition performance and response can be suitably adjusted in this speech recognition method.

The speech recognition method may further include detecting of a silent section from audio information in the input section. In the determining of the criteria value, a threshold value may be determined as the criteria value that is information for determining an end of the processing section and that indicates the length of the first silent section. In the determining of the processing mode, the processing mode may be determined based on the threshold value. In the obtaining of the audio information, audio information of the processing section may be extracted from the audio information of the input section, by determining a point-in-time where the length of the silent section exceeds the threshold value to be the end of the processing section.

According to this configuration, the processing section can be adaptively set in accordance with the input audio information. In such a case where the processing section is adaptively determined, the processing mode can be easily changed by changing the processing mode using the threshold value.

For example, in the determining of the criteria value, the lengths of the processing section and the section of interest may be determined as the criteria value. In the determining of the processing mode, the processing mode may be determined based on the length of the first silent section, that is the difference between the length of the processing section and the length of the section of interest that have been determined. In the obtaining of the audio information, audio information of the processing section of the length that has been determined, may be extracted from the audio information of the input section.

According to this configuration, the processing amount can be reduced, since a preset section can be extracted. In such a case where processing sections of fixed time lengths are determined, the processing mode can be easily changed by changing the processing mode using the fixed section lengths.

For example, in the executing of the audio processing, a silent section included in the section of interest may be removed, and the audio processing may be executed as to the audio information in the section of interest from which the silent section has been removed.

According to this configuration, processing amount can be reduced and response can be improved.

For example, the speech recognition method may further include: measuring of processing time of the audio processing in the processing mode that has been determined; and changing the processing mode for audio processing based on the processing time that has been measured.

According to this configuration, the processing mode can be adjusted based on the amount of time actually taken, so speech recognition performance and response can be adjusted in a more suitable manner.

For example, the audio processing may be noise suppression processing of the audio information. In the determining of the processing mode, a noise suppression algorithm or a noise suppression parameter may be determined as the processing mode.

For example, the speech recognition method may further include: transmitting of audio information that has been subjected to encoding as the audio processing, to a speech recognition apparatus; and decoding of the transmitted audio information at the speech recognition apparatus. The audio processing may be encoding processing of the audio information. In the determining of the processing mode, an encoding algorithm or an encoding parameter may be determined as the processing mode. In the executing of the speech recognition processing, the speech recognition apparatus may execute the speech recognition processing on the decoded audio information.

For example, in the determining of the processing mode, the processing mode to execute the audio processing may be determined such that the audio processing will be executed on the audio information in the section of interest, during the time length of the processing section in the executing of the audio processing.

According to this configuration, audio processing can be performed on audio information in the section of interest, using the first silent section.

A speech recognition apparatus according to an aspect of the present disclosure includes: a processor; and memory having a computer program stored thereon. The computer program causes the processor to execute operations including determining of a criteria value to determine a length of a first silent section included in a processing section, determining of a processing mode to be used out of multiple processing modes for audio processing of which the processing amounts differ from each other, in accordance with the criteria value, obtaining of audio information in an input section including the processing section, obtaining of audio information of the processing section including a section of interest and the first silent section following the section of interest, out of audio information in the input section, using the criteria value, executing of audio processing on the audio information in the section of interest, out of the audio information in the processing section, using the processing mode that has been determined, and executing of speech recognition processing on the audio information in the section of the interest where the audio processing has been performed.

According to this configuration, the speech recognition apparatus can select the processing mode taking into consideration performing audio processing on the audio information in the section of interest, using the first silent section, by changing the processing mode in accordance with the length of the first silent section.

According to an aspect of the present invention, a non-transitory recording medium has a computer program stored thereon that causes a processor to execute the speech recognition method.

These general or specific embodiments may be implemented as a system, a method, an integrated circuit, a computer program, or a storage medium such as a computer-readable compact-disc read-only memory (CD-ROM), or any selective combination of a system, a method, an integrated circuit, a computer program, or a storage medium.

Embodiments of the present disclosure will be described in detail with reference to the drawings. Note that the embodiments described below are all specific examples of the present disclosure. Values, shapes, materials, components, arrangement and connection of components, steps, orders of steps, and so forth in the following embodiments are only exemplary, and do not restrict the present disclosure. Components in the following embodiments which are not included in an independent Claim indicating the highest concept are described as being optional components.

First Embodiment

A speech recognition apparatus according to a first embodiment changes processing modes of audio processing in accordance with the length of silent sections included in a processing section. Accordingly, the speech recognition apparatus can suitably adjust performance and response of speech recognition.

First, the configuration of the speech recognition apparatus according to the present embodiment will be described. FIG. 1 is a block diagram illustrating the configuration of the speech recognition apparatus 100 according to the present embodiment. The speech recognition apparatus 100 illustrated in FIG. 1 executes audio processing on audio information, and performs speech recognition on the audio information following audio processing. This speech recognition apparatus 100 is used in a speech translation system where a user and a terminal perform speech translation in real time by voice, a speech conversation system where conversation is performed in real time, and so forth.

The speech recognition apparatus 100 includes a criteria value determining unit 101, a processing mode determining unit 102, an audio obtaining unit 103, an end-of-speech determining unit 104, an audio processing unit 105, and a speech recognition unit 106. Note that the functions of the speech recognition apparatus 100 may be realized by a singular device, or may be realized by multiple devices.

Figure 3:
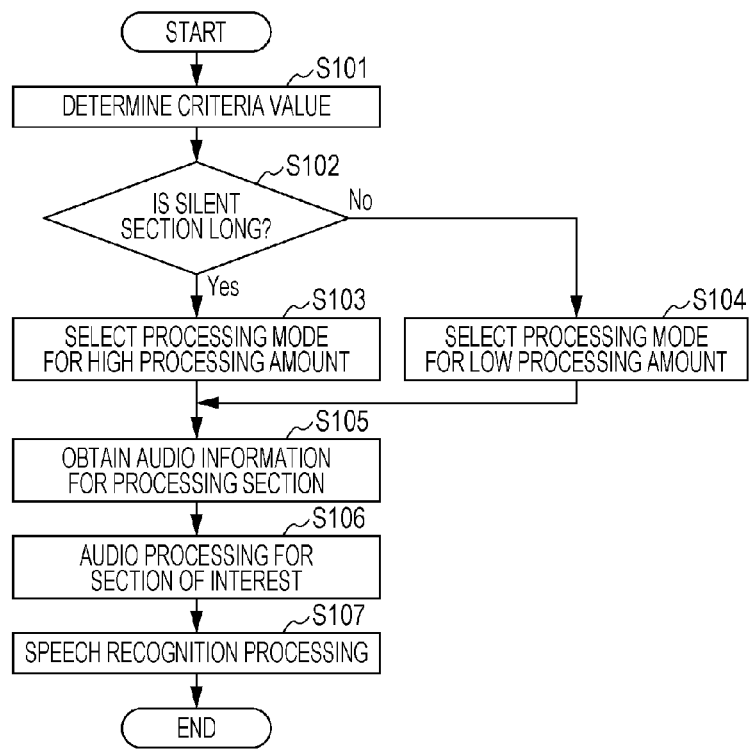
FIG. 3 is a flowchart of speech recognition processing according to the first embodiment.
Figure 4:
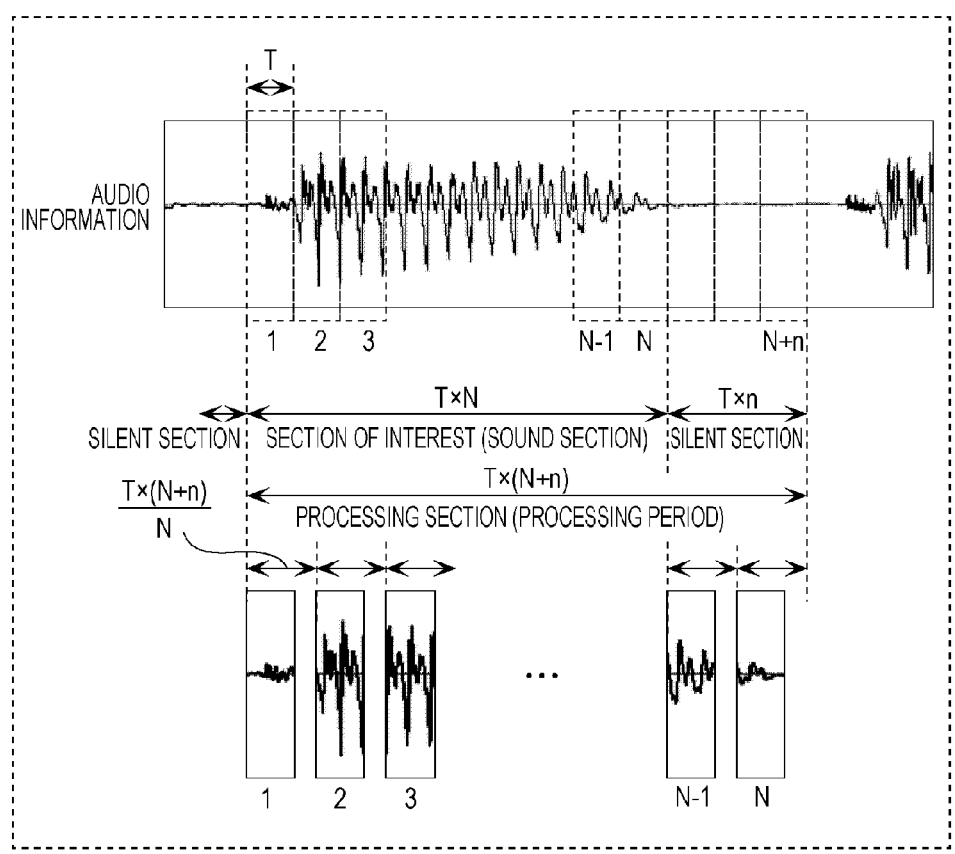
FIG. 4 is a diagram for describing speech recognition according to the first embodiment.
Figure 5:
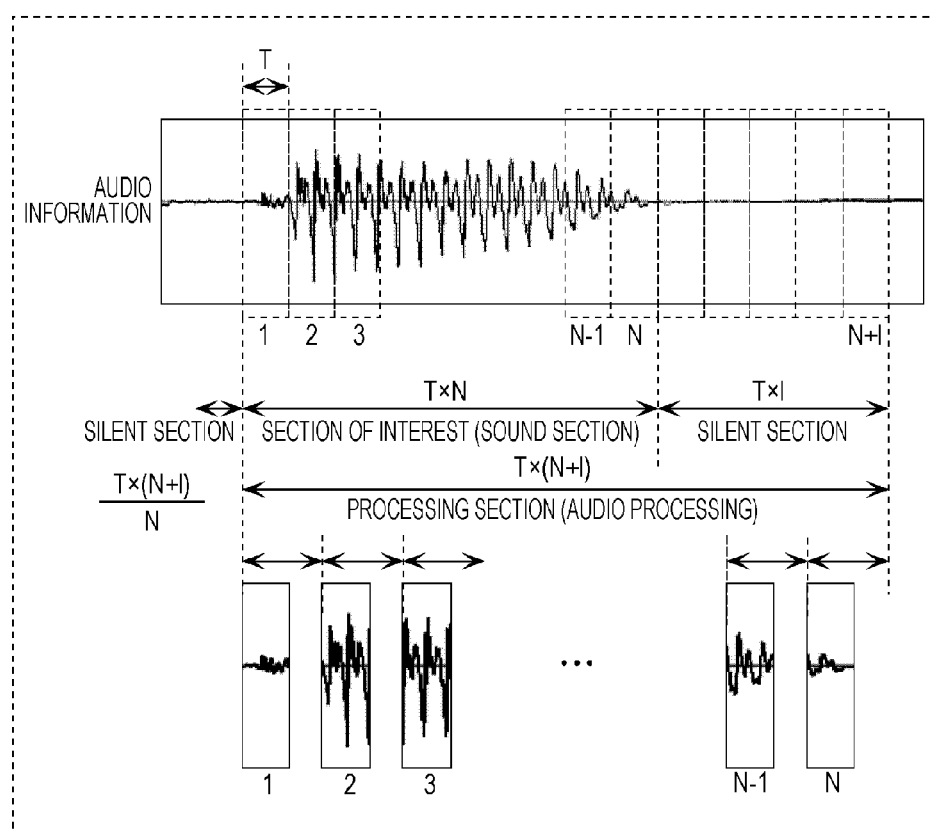
FIG. 5 is a diagram for describing speech recognition according to the first embodiment.

Next, the speech recognition processing performed by the speech recognition apparatus 100 will be described. FIG. 3 is a flowchart of this speech recognition processing. FIGS. 4 and 5 are schematic diagrams for describing audio information and audio processing.

First, the criteria value determining unit 101 determines a criteria value for determining the length of a silent section (first silent section) contained in a processing section (S101). Note that frames of the predetermined period T are set regarding the audio information, and the audio processing is performed in increments of these frames.

A processing section is an audio section corresponding to one utterance, and is equivalent to a processing increment of speech recognition processing. A processing section includes a section of interest which is a sound section, and a silent section (first silent section) after the section of interest, for example. Specifically, a section of interest is situated at the head of a processing section. A silent section immediately follows the section of interest, and also is situated at the end of the processing section.

A sound section is a section including audio, and more specifically is a section where the intensity of the audio indicated by audio information is a predetermined value or above. A silent section is a section not including audio, and more specifically is a section where the intensity of the audio indicated by audio information is below the threshold value. The audio intensity in each frame may be an average value of multiple samples included in the frame, the maximum value thereof, a median value thereof, or the like. Audio intensity of audio after noise removal may be used in determining sound sections and silent sections. Moreover, likelihood may used to measure how much like a voice the audio is, instead of using audio intensity.

The section of interest is a section where audio processing is performed. A silent section (first silent section) is a section that is not the section of interest, where audio processing is not performed.

The processing mode determining unit 102 determines whether or not a silent section included in a processing section is long, in accordance with the criteria value determined in step S101 (S102). Specifically, the processing mode determining unit 102 determines whether or not a silent section included in a processing section is longer than a predetermined value. In a case where the silent section is long (Yes in S102), the processing mode determining unit 102 selects a high processing amount and high-performance processing mode (S103). Note that the processing amount (processing load) and processing performance are in a tradeoff relationship, as described earlier. A processing mode is an audio processing algorithm or audio processing parameter, for example.

On the other hand, in a case where the silent section is short (No in S102), the processing mode determining unit 102 selects a low processing amount and low-performance processing mode (S104).

Although an example is illustrated here where only two processing modes exist, it is sufficient for multiple processing modes to exist. That is to say, multiple threshold values may be used, and the longer the silent section is, the higher the processing amount of the processing mode may be. Thus, the processing mode determining unit 102 determines the processing mode to use from multiple processing modes for audio processing that different in processing amount from each other, in accordance with the criteria value. In other words, the processing mode determining unit 102 determines the processing mode to use in accordance with the duration of the silent section included in the processing section.

Next, the audio obtaining unit 103 sequentially obtains audio information input in time sequence. That is to say, the audio obtaining unit 103 obtains audio information of an input section including the processing section. The end-of-speech determining unit 104 obtains audio information of the processing section from the audio information of the input section, using the criteria value (S105). Specific examples of the criteria value, and methods for determining the processing section from the audio information being input in time sequence using the criteria value, will be described in detail in second and third embodiments.

Next, the audio processing unit 105 executes audio processing on the audio information in the section of interest, out of the audio information in the processing section, in the processing mode determined in step S103 or S104 (S106). That is to say, the audio processing unit 105 executes audio processing only regarding the audio information in the section of interest, and does not execute audio processing on audio information in a silent section. Examples of audio processing include noise suppressing processing and so forth.

Although obtaining of audio information (S105) and audio processing (S106) are listed as separate processing in FIG. 3, these may be performed in parallel. For example, obtaining of audio information and audio processing may be performed consecutively in increments of frames. That is to say, there is no need for all audio information in a section of interest to be obtained first and then audio processing of the audio information in the section of interest to be performed later. The audio information in a frame that has been obtained may be subjected to audio processing in order.

Next, the speech recognition unit 106 performs speech recognition processing on the audio information that has been subjected to audio processing in step S105 (S107). Specifically, the speech recognition unit 106 converts the audio information into text data representing content of speech. Speech translation processing also is performed in accordance with the speech content indicated by this text data.

The silent section included in the processing section is also used in the audio processing of the section of interest in the present embodiment. That is, the processing mode is determined in steps S103 and S104 so that audio processing is performed on audio information in a section of interest during the duration of the processing section. Specifically, not only the section of interest but also the silent section added thereto is assigned as a processing period for the audio processing of the section of interest, as illustrated in FIG. 4. For example, in a case where there are N frames in the section of interest and n frames of silent sections as illustrated in FIG. 4, audio processing is performed for the N-frame section of interest, for a processing period equivalent to N+n frames. Accordingly, (T×(N+n))/N can be assigned as the processing time for each frame, and accordingly the processing time of each frame can be set longer than the arrangement in FIG. 1. Accordingly, higher performance (higher load) processing modes can be used, thereby improving audio processing performance. This also enables performance of speech recognition to be improved.

Now, an utterance used in speech recognition has a silent section after the speech section (sound section), that serves as a break for the utterance. The present embodiment can realize processing with higher performance, by using this silent section in audio processing of the section of interest, which is the speech section. A suitable processing mode can be determined in the above-described processing mode determining, assuming that the silent section will be used in this way. That is to say, changing the processing mode in accordance with the duration of the silent section enables a processing mode to be selected that takes into consideration performing audio processing on audio information in the section of interest, using the silent section.

For example, FIG. 5 illustrates an operation example of a case where the silent section is longer than the case in FIG. 4. In a case where the silent section is 1 frame (1>n) as illustrated in FIG. 5, and longer than the n frames illustrated in FIG. 4, the processing mode is determined such that the time (T×(N+1))/N assigned to processing of the frames is also longer. Although FIGS. 4 and 5 illustrate examples where the processing periods assigned to audio processing of the section of interest are equal to the processing section, the processing period does not necessarily have to be equal to the processing section. The processing period may be shorter than or longer than the processing section.

Second Embodiment

A second embodiment will be described, with regard to a first method for determining the processing section from the audio information input in time sequence. Note that the following description will be made primarily regarding points that differ from the above description, and redundant description will be omitted.

Figure 2:
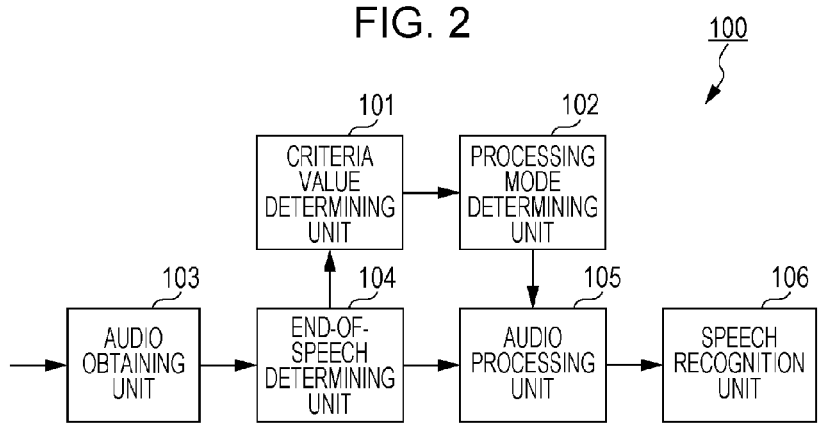
FIG. 2 is a block diagram of a speech recognition apparatus according to a first embodiment.
Figure 6:
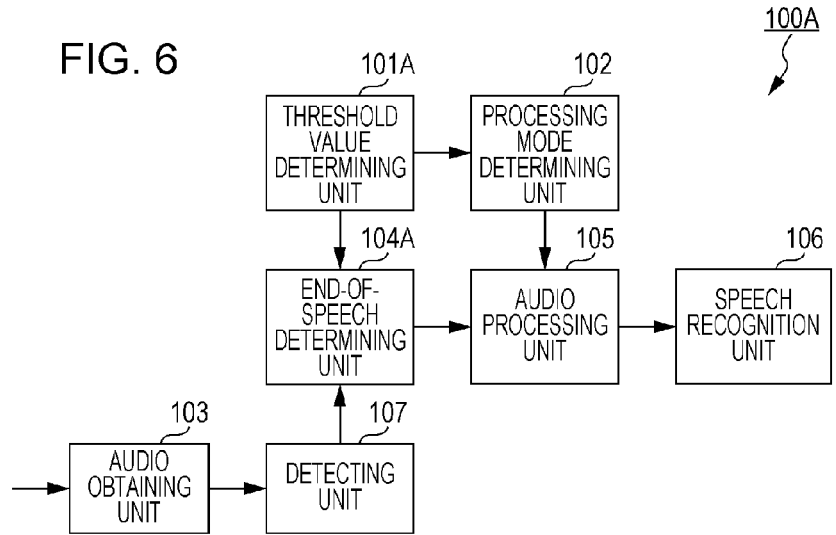
FIG. 6 is a block diagram of a speech recognition apparatus according to a second embodiment.

FIG. 6 is a block diagram illustrating the configuration of an speech recognition apparatus 100A according to the present embodiment. The speech recognition apparatus 100A in FIG. 6 has a threshold determining unit 101A that is an example of the criteria value determining unit 101 illustrated in FIG. 2, and an end-of-speech determining unit 104A that is an example of the end-of-speech determining unit 104 illustrated in FIG. 2. The speech recognition apparatus 100A further includes a detecting unit 107.

The detecting unit 107 detects silent sections from the audio information in the input section. Specifically, the detecting unit 107 determines whether or not each frame in the audio information input in time sequence is a sound section or a silent section.

The threshold determining unit 101A determines a threshold value T0 indicating the length of the silent section (first silent section) included in the processing section, which is information for determining the end of the processing section. The end-of-speech determining unit 104A uses the determined threshold value T0 to extract audio information of the processing section from the audio information input in time sequence.

Figure 7:
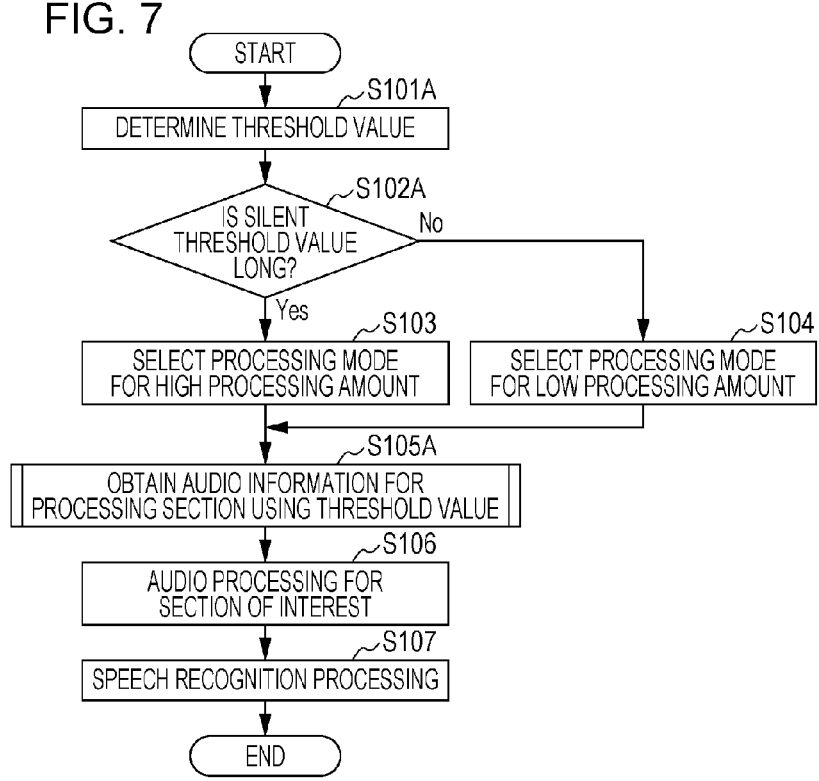
FIG. 7 is a flowchart of speech recognition processing according to the second embodiment.

FIG. 7 is a flowchart of speech recognition processing according to the present embodiment. First, the threshold determining unit 101A determines the threshold value T0 (S101A). This threshold value T0 is, for example, around several hundred milliseconds.

Next, the processing mode determining unit 102 determines the processing mode based on the threshold value T0 (S102A). Specifically, the processing mode determining unit 102 determines whether the threshold value T0 is a predetermined value or longer. In a case where the threshold value T0 is long (Yes in S102A), the processing mode determining unit 102 selects a high processing amount and high-performance processing mode (S103). On the other hand, in a case where the threshold value T0 is shorter (No in S102A), the processing mode determining unit 102 selects a low processing amount and low-performance processing mode (S104). The number of processing modes is not restricted in particular as long as there are multiple processing modes. An arrangement may be made where there are three stages or more to switch between, and the longer the threshold value T0 is, the higher the processing amount of the processing mode may be.

The following method may be used to determine the threshold value T0 in step S101A. For example, the threshold determining unit 101A may determine the threshold value based on a parameter or the like determined beforehand. The parameter or the like may be set when the system is being developed, or may be set by the user. That is to say, the threshold value T0 may be determined based on external input or operations. In this case, the threshold value T0 does not dynamically change when in use, so the threshold value determining processing in step S101A only needs to be performed once at a predetermined timing.

Alternatively, the threshold determining unit 101A may change this threshold value T0 dynamically. For example, the speech recognition apparatus 100A may identify a speaker based on audio information, and dynamically set the threshold value T0 so as to be appropriate for the identified speaker. For instance, changing the threshold value T0 according to the age or the like of the speaker is conceivable. Information to be used for changing the threshold value T0 according to age or the like of the speaker may be registered beforehand for each speaker. Alternatively, the threshold value for each speaker, or parameters for changing the threshold value (e.g., information indicating how fast the speaker speaks) may be registered beforehand, with the threshold determining unit 101A using this information to change the threshold value T0. Moreover, the threshold value T0 may be changed depending on the conversation content. For example, different threshold values T0 may be set for a case where simple answers such as "yes" and "no" are expected for the content of speech, and a case where long sentences are expected.

Next, the end-of-speech determining unit 104A uses the threshold value T0 decided in step S101A to extract audio information of the processing section, from the audio information input in time sequence (S105A).

Figure 8:
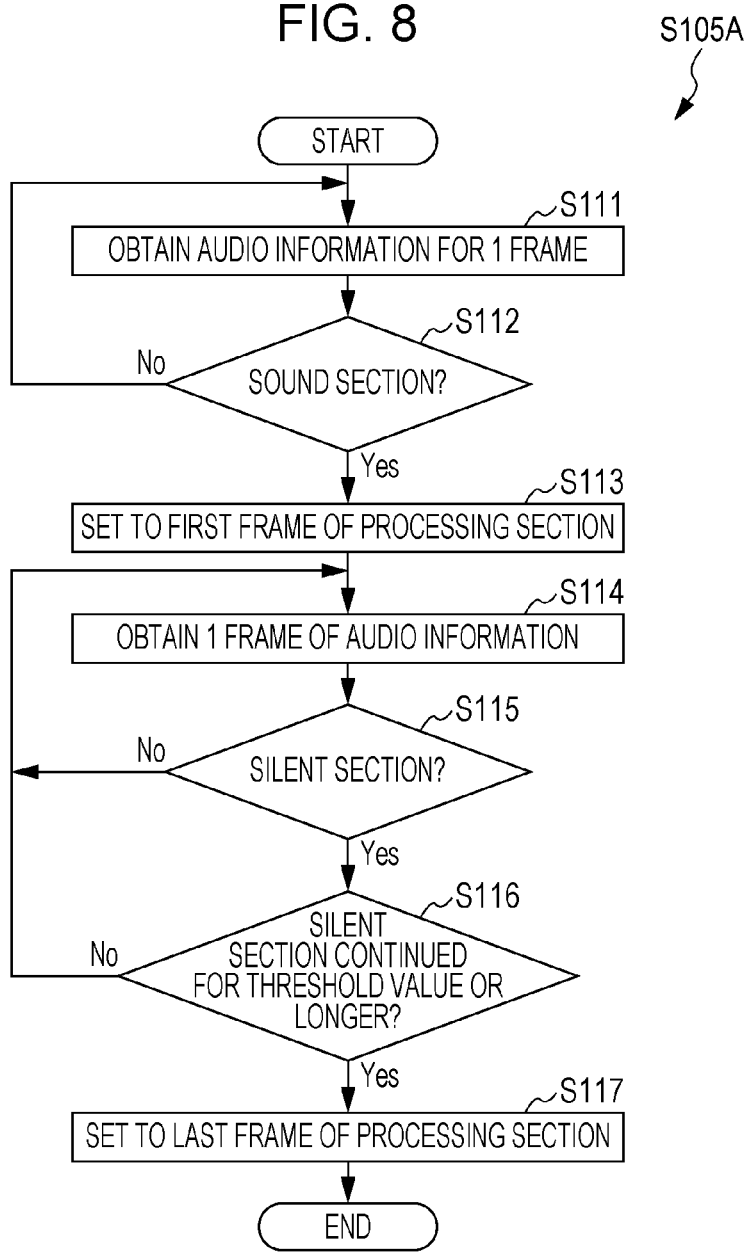
FIG. 8 is a flowchart of end-of-speech processing according to the second embodiment.
Figure 9:
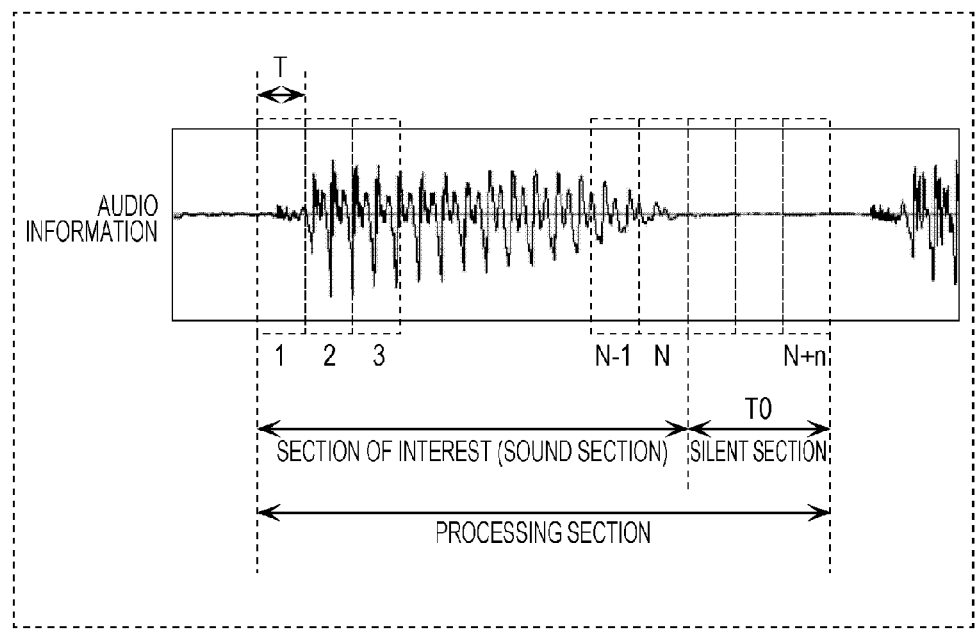
FIG. 9 is a flowchart for describing end-of-speech processing according to the second embodiment.

FIG. 8 is a flowchart of this processing section extracting processing (S105A). First, the head of the processing section is determined. Specifically, the audio obtaining unit 103 obtains audio information of one frame at a certain point-in-time (S111). Next, the detecting unit 107 determines whether the frame is a sound section or a silent section (S112).

In a case where the frame is a silent section (No in S112), processing of step S111 and thereafter is performed at the next frame. On the other hand, in a case where the frame is a sound section (Yes in S112), the end-of-speech determining unit 104A sets this frame as the head frame of the processing section (S113).

Next, the end of the processing section is determined. Specifically, the audio obtaining unit 103 obtains audio information of the next one frame (S114). The detecting unit 107 determines whether or not this frame is a silent section (S115). In a case where this frame is a silent section (Yes in S115), the end-of-speech determining unit 104A determines whether the continuous length of the silent section including this frame is threshold value T0 or longer (S116). In a case where the length of the silent section is threshold value T0 or longer (Yes in S116), the end-of-speech determining unit 104A sets this frame as the end frame of the processing section (S117). Otherwise (No in S115 or No in S116), the processing of step S114 and thereafter is performed on the next frame.

That is to say, the end-of-speech determining unit 104A determines the point-in-time (frame) where the length of the silent section exceeds the threshold value T0 to be the end of the processing section, and thereby extracts audio information of the processing section from the audio information of the input section.

Next, the audio processing unit 105 executes audio processing on the audio information in the section of interest, in the same way as in the first embodiment (S106). Obtaining of audio information (S105) and audio processing (S106) may be performed in frame increments, for example, in the same way as in the first embodiment.

Next, the speech recognition unit 106 performs speech recognition processing on the audio information that has been subjected to audio processing (S107). Thus, the speech recognition apparatus 100A according to the present embodiment can adaptively set processing sections in accordance with input audio information. In a case of adaptively determining the processing section in this way, the processing mode can be easily changed by changing the processing mode using the threshold value T0.

Third Embodiment

A second method of determining the processing section from the audio information input in time sequence will be described in a third embodiment. In the present embodiment, sections of predetermined lengths are extracted as the processing section, without determining silent sections. For example, in a case where simple answers such as "yes" and "no" are expected for the content of speech, the length of the sound section (section of interest) can be estimated. Accordingly, the length of the processing section, section of interest, and silent section can be determined beforehand, based on this prediction.

Figure 10:
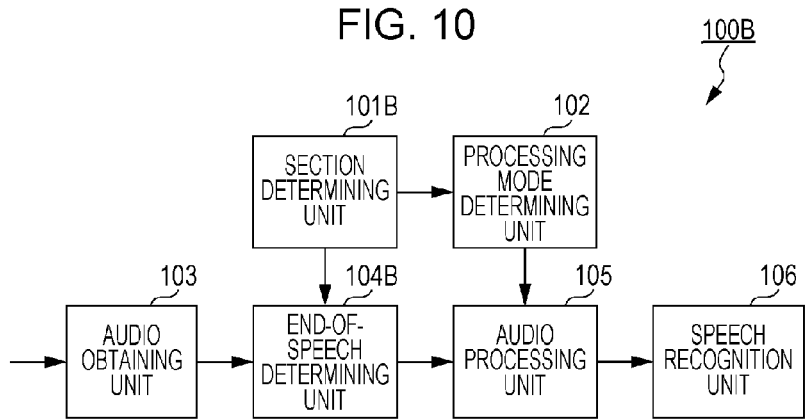
FIG. 10 is a block diagram of a speech recognition apparatus according to a third embodiment.

FIG. 10 is a block diagram illustrating the configuration of a speech recognition apparatus 100B according to the present embodiment. The speech recognition apparatus 100B illustrated in FIG. 10 includes a section determining unit 101B that is an example of the criteria value determining unit 101 in FIG. 2, and an end-of-speech determining unit 104B that is an example of the end-of-speech determining unit 104 in FIG. 2.

The section determining unit 101B determines a processing section length T1 that is the length of the processing section, and a section-of-interest length T2 that is the length of the section of interest. The same method as the above-described threshold value T0 can be used for determining the processing section length T1 and section-of-interest length T2.

The end-of-speech determining unit 104B extracts audio information of the processing section length T1 from the audio information of the input section.

Figure 11:
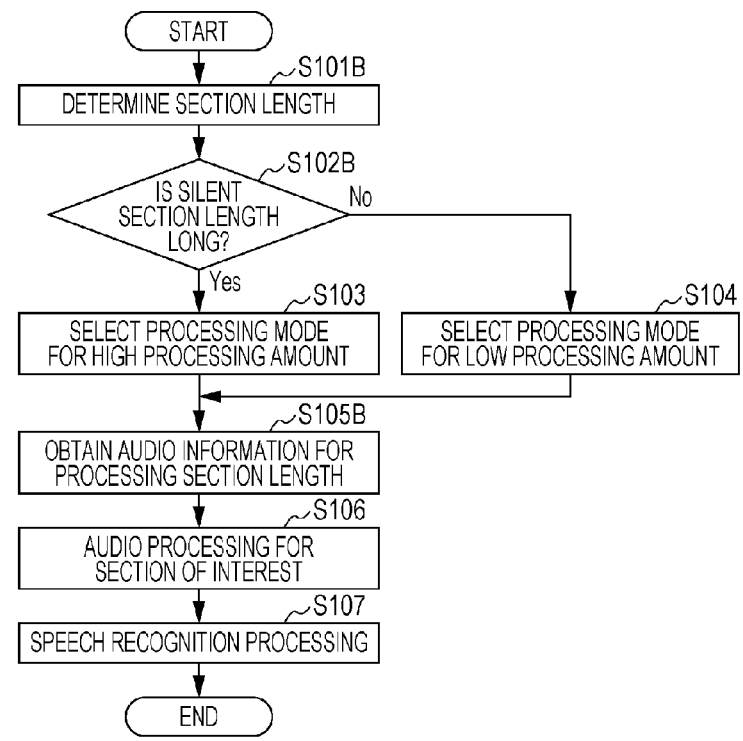
FIG. 11 is a flowchart of speech recognition processing according to the third embodiment.
Figure 12:
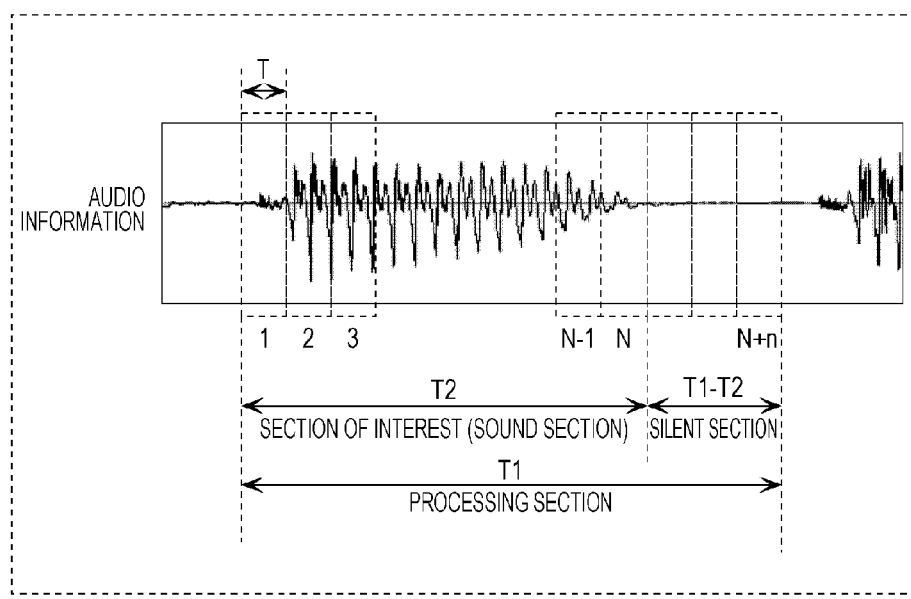
FIG. 12 is a diagram for describing end-of-speech processing according to the third embodiment.

FIG. 11 is a flowchart of speech recognition processing according to the present embodiment. first, the section determining unit 101B determines the processing section length T1 and section-of-interest length T2 (S101B).

Next, the processing mode determining unit 102 Calculates the difference between the processing section length T1 and section-of-interest length T2 (i.e., T1 minus T2) as a silent section length, which is the length of the silent section. The processing mode determining unit 102 then determines the processing mode based on the calculated silent section length (S102B). Specifically, the processing mode determining unit 102 determines whether the silent section length is a predetermined value or longer. In a case where the silent section length is long (Yes in S102B), the processing mode determining unit 102 selects a high processing amount and high-performance processing mode (S103). On the other hand, in a case where the silent section length is shorter (No in S102B), the processing mode determining unit 102 selects a low processing amount and low-performance processing mode (S104). The number of processing modes is not restricted in particular as long as there are multiple processing modes. An arrangement may be made where there are three stages or more to switch between, and the longer the silent section length is, the higher the processing amount of the processing mode may be.

Note that it is sufficient that at the section determining unit 101B, the processing section length and section-of-interest length be determined, or any two of the processing section length, section-of-interest length, and silent section length be determined. In this case, the other one section length can be calculated from the two determined section lengths. Further, an arrangement may be made where one of these section lengths is fixed, and the one of the other two sections is determined. Also here, in a case where the silent section length can be uniquely identified using the processing section length or section-of-interest length, the processing mode determining unit 102 may determine the processing mode in accordance with the processing section length or section-of-interest length. For example, in a case where the section-of-interest length is fixed, the silent section length changes in accordance with the processing section length, is the processing mode can be determined in accordance with the processing section length.

Next, the end-of-speech determining unit 104B extracts audio information of the processing section of the processing section length T1 determined in step S101B, from the audio information input in time sequence (S105B). For example, the end-of-speech determining unit 104B detects the head of the processing section in the same way as in FIG. 8. Next, the end-of-speech determining unit 104B determines the audio information of the processing section length T1 from this head to be the audio information of the processing section. The end-of-speech determining unit 104B also determines the audio information of the section-of-interest length T2 from this head to be audio information of the section of interest. The end-of-speech determining unit 104B determines from the end of the section of interest to the end of the processing section to be the silent section.

Next, the audio processing unit 105 executes audio processing on the audio information in the section of interest, in the same way as in the first embodiment (S106). Obtaining of audio information (S105) and audio processing (S106) may be performed in frame increments, for example, in the same way as in the first embodiment.

Next, the speech recognition unit 106 performs speech recognition processing on the audio information that has been subjected to audio processing (S107). Thus, The speech recognition apparatus 100B according to the present embodiment can reduce the processing amount, since predetermined sections can be extracted. In a case where processing sections of fixed time lengths are determined, the processing mode can be easily changed by changing the processing mode using the fixed section lengths.

Fourth Embodiment

Figure 13:
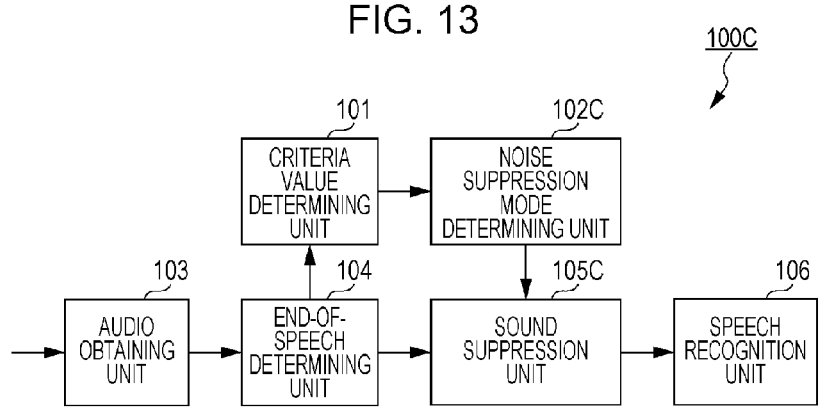
FIG. 13 is a block diagram of a speech recognition apparatus according to a fourth embodiment.

A fourth embodiment will be described regarding a case of performing noise suppressing processing, as a specific example of audio processing. FIG. 13 is a block diagram illustrating the configuration of a speech recognition apparatus 100C according to the present embodiment. The speech recognition apparatus 100C has a noise suppression mode determining unit 102C that is a specific example of the processing mode determining unit 102, and a noise suppression unit 105C that is a specific example of the audio processing unit 105.

The noise suppression mode determining unit 102C determines a noise suppression algorithm or a noise suppression parameter as the processing mode. The noise suppression unit 105C performs noise suppression processing on the audio information in the section of interest, based on the noise suppression algorithm or noise suppression parameter.

Fifth Embodiment

Figure 14:
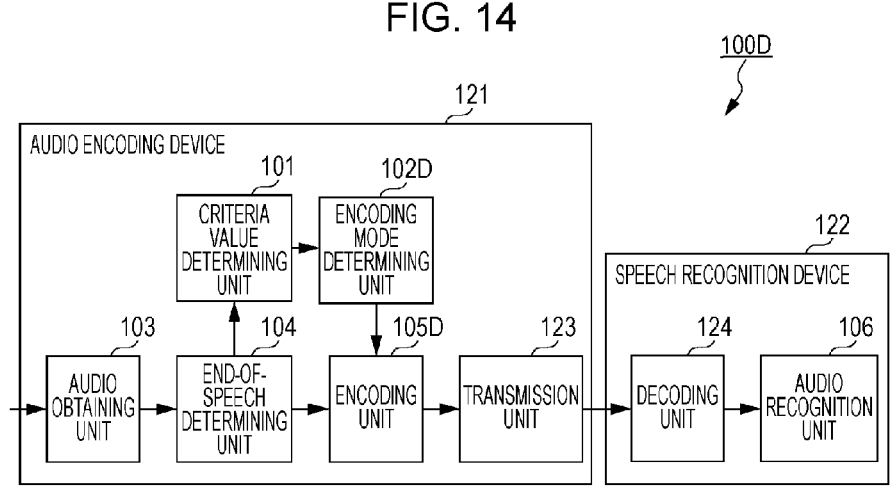
FIG. 14 is a block diagram of a speech recognition system according to a fifth embodiment.

A fifth embodiment will be described. The present embodiment relates to a case of performing encoding processing, as a specific example of audio processing. FIG. 14 is a block diagram illustrating the configuration of a speech recognition apparatus 100D according to the present embodiment. This speech recognition apparatus 100D includes an audio encoding device 121 and a speech recognition device 122.

The audio encoding device 121 includes the criteria value determining unit 101, an encoding mode determining unit 102D that is a specific example of the processing mode determining unit 102, the audio obtaining unit 103, the end-of-speech determining unit 104, an encoding unit 105D that is a specific example of the audio processing unit 105, and a transmission unit 123. The speech recognition device 122 includes a decoding unit 124 and the speech recognition unit 106.

Figure 15:
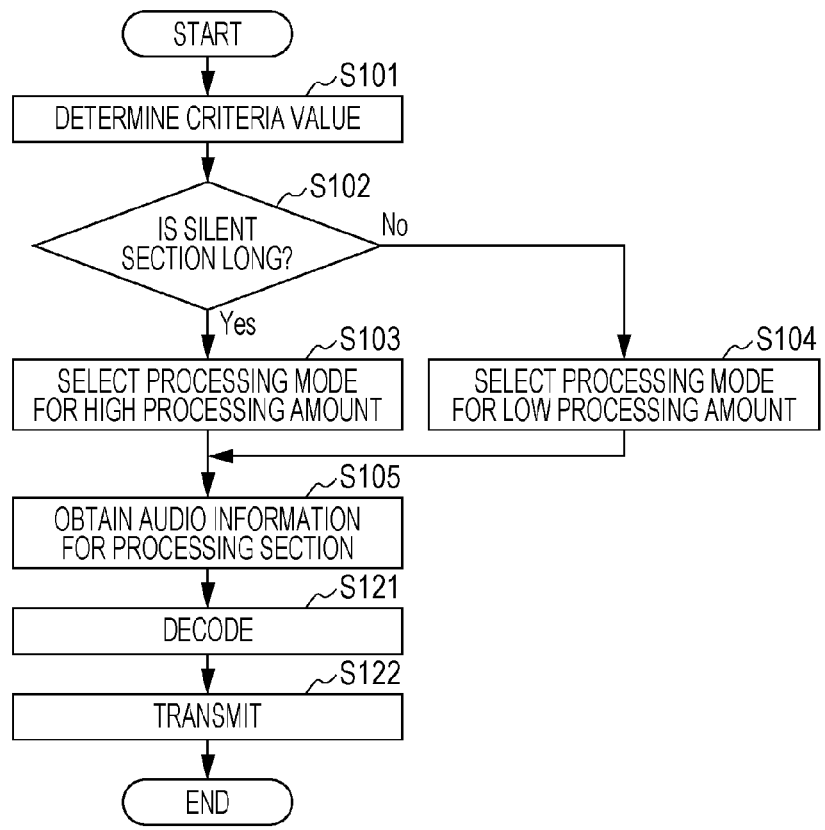
FIG. 15 is a flowchart of encoding processing according to the fifth embodiment.

FIG. 15 is a flowchart of audio encoding processing according to the audio encoding device 121 Note that the processing in steps S101, S102, and S105 is the same as in FIG. 3.

The encoding mode determining unit 102D determines an encoding algorithm or encoding parameter as the processing mode (S103, S104). The encoding unit 105D performs encoding processing on the audio information in the section of interest, based on the encoding algorithm or encoding parameter that has been determined (S121). Next, the transmission unit 123 transmits the encoded audio information to the speech recognition device 122 (S122).

Figure 16:
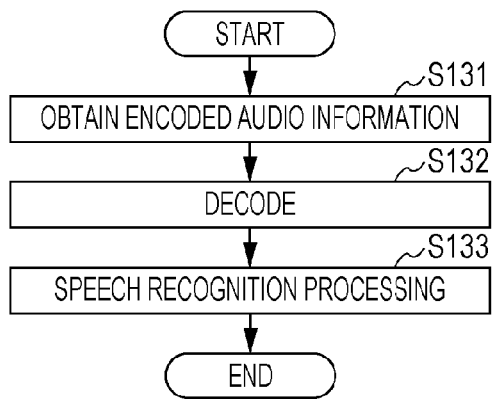
FIG. 16 is a flowchart of speech recognition processing according to the fifth embodiment.

FIG. 16 is a flowchart for speech recognition processing by the speech recognition device 122. First, the decoding unit 124 obtains the encoding audio information that has been transmitted from the audio encoding device 121 (S131) and decodes the audio information (S132). The speech recognition unit 106 performs speech recognition processing on the decoded audio information (S133). Details of the speech recognition processing are the same as in the first embodiment.

Although examples have been described here where the audio processing is noise suppression processing or encoding processing, other audio processing may be used as well. For example, the audio processing may be direction estimation where the direction of a sound source is estimated, or the like. Sixth Embodiment.

Figure 17:
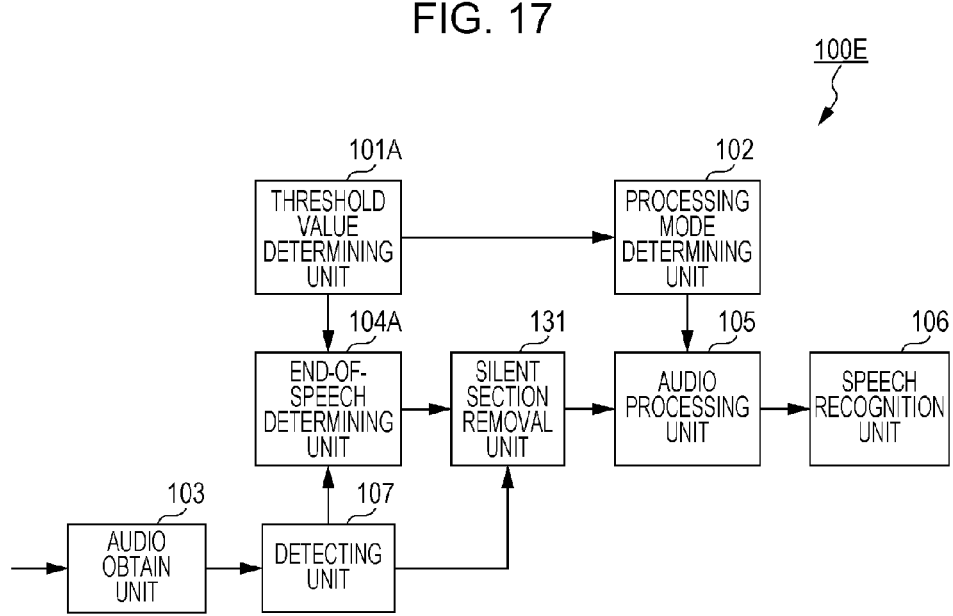
FIG. 17 is a block diagram of a speech recognition apparatus according to a sixth embodiment.

A sixth embodiment will be described. The present embodiment is a modification of the second embodiment. FIG. 17 is a block diagram illustrating the configuration of a speech recognition apparatus 100E according to the present embodiment. The speech recognition apparatus 100E has, in addition to the configuration of the speech recognition apparatus 100A illustrated in FIG. 6, a silent section removal unit 131.

Figure 18:
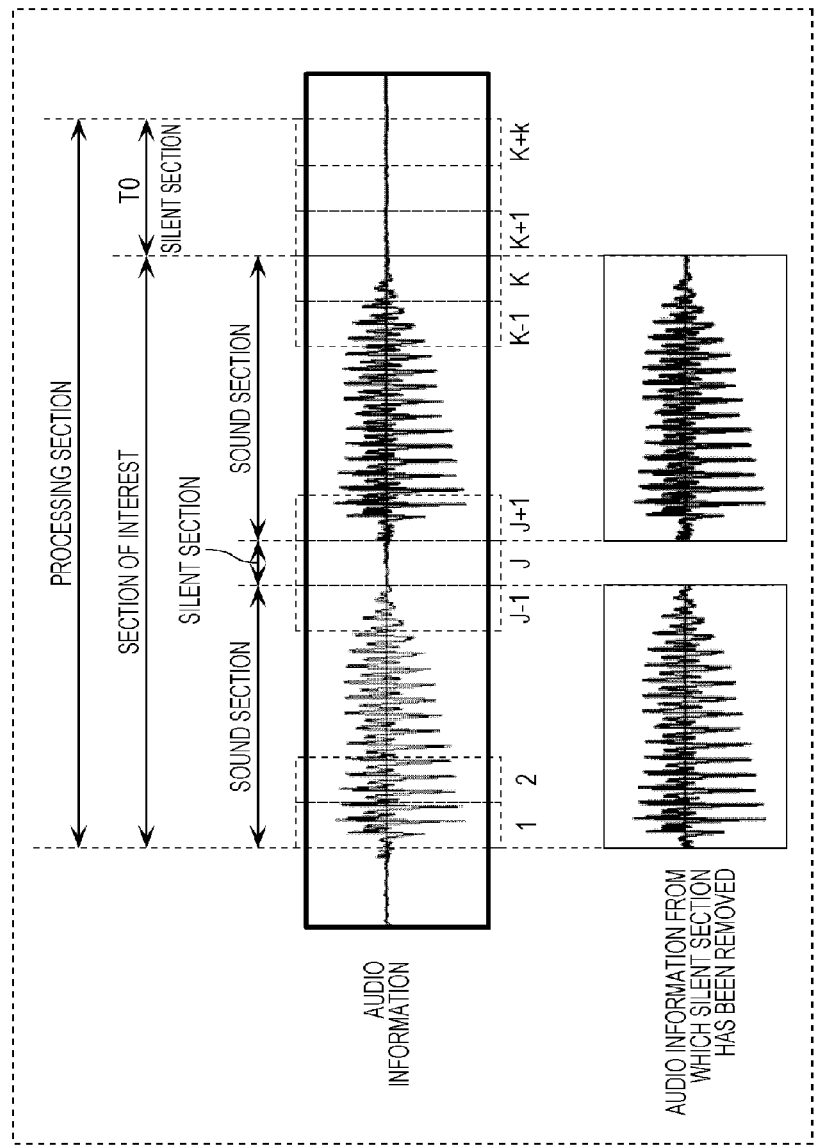
FIG. 18 is a diagram for describing silent section removal processing according to the sixth embodiment.

The silent section removal unit 131 removes silent sections included in the section of interest. the audio processing unit 105 performs audio processing on audio information in the section of interest from which the silent sections have been removed. For example, in the example illustrated in FIG. 18, frame J is a silent section, but the length of the silent section is shorter than the threshold value T0, and accordingly has been left included in the section of interest. the silent section removal unit 131 removes this frame J from the section of interest.

Accordingly, processing of the frame J at the audio processing unit 105 is unnecessary, so the amount of processing can be reduced and response can be improved. Although an example of applying the present modification to the configuration in the second embodiment has been described here, the same modification can be applied to the configuration of the third embodiment.

Seventh Embodiment

Figure 19:
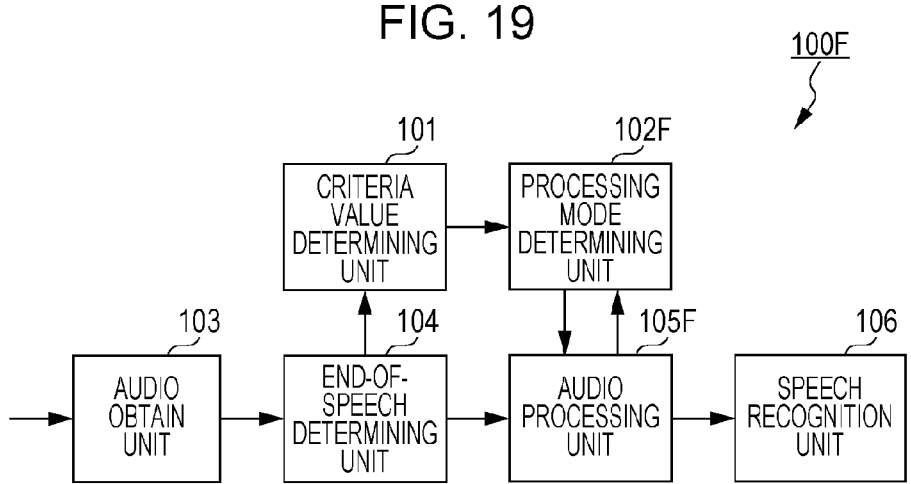
FIG. 19 is a block diagram of a speech recognition apparatus according to a seventh embodiment.

A seventh embodiment will be described. A modification of the first embodiment will be described here. FIG. 19 is a block diagram illustrating the configuration of a speech recognition apparatus 100F according to the present embodiment. The speech recognition apparatus 100F has a processing mode determining unit 102F and an audio processing unit 105F added to the speech recognition apparatus 100 according to the first embodiment.

Figure 20:
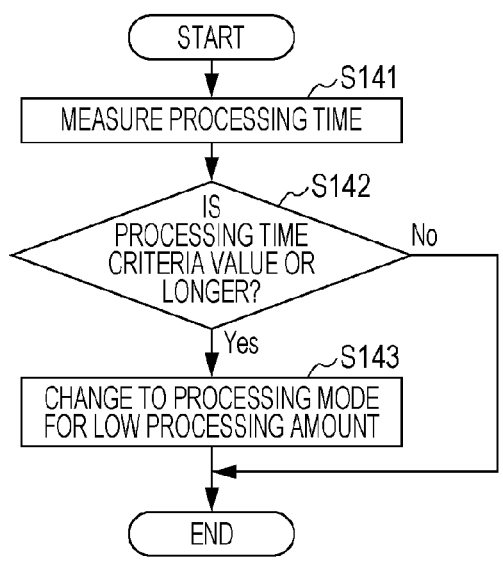
FIG. 20 is a flowchart of processing mode updating processing according to the seventh embodiment.

FIG. 20 is a flowchart of additional functions by the speech recognition apparatus 100F. First, after performing the audio processing in FIG. 3 (S106) for example, the audio processing unit 105F measure the processing time taken for this audio processing (S141).

Next, the processing mode determining unit 102F changes the processing mode for the audio processing, based on the measured processing time. Specifically, the processing mode determining unit 102F determines whether or not the measured processing time is equal to or above a criteria value (S142). The criteria value here is the processing period, and is an upper limit value of the processing time that is assumed.

In a case where the processing time is equal to or longer than the criteria value (Yes in S142), the processing mode determining unit 102F changes the current processing mode (the processing mode determined in steps S103 or S104 in FIG. 3) to a processing mode with less processing amount (S143). On the other hand, in a case where the processing time is shorter than the criteria value (No in S142), the processing mode determining unit 102F does not change the processing mode.

The processing illustrated in FIG. 20 is performed in increments of processing sections, for example. The processing illustrated in FIG. 20 may be performed at a predetermined cycle including multiple processing sections. In this case, processing may be performed based on an average value or the like of the processing time among multiple processing sections including in the cycle.

Accordingly, the speech recognition apparatus 100F can adjust the processing mode in accordion with the processing time actually required for the processing, so the performance and response of speech recognition can be suitably adjusted.

Although a speech recognition apparatus and speech recognition system have been described by way of embodiments of the present disclosure, the present disclosure is not restricted to these embodiments. For example, the processing units included in the speech recognition apparatus or speech recognition system may typically be configured as a large scale integration (LSI). These may each be independently formed as a single chip, or part or all may be included in a single chip.

Integrated circuits are not restricted to an LSI, and may be realized by dedicated circuits or general-purpose processors. A Field Programmable Gate Array (FPGA) capable of being programmed after manufacturing the LSI, or a reconfigurable processor of which the connections and settings of circuit cells within the LSI can be reconfigured, may be used.

The components may be realized by being configured as dedicated hardware, or by software programs corresponding to the components being executed. The components may be realized by a program executing unit such as a central processing unit (CPU) or some other processor reading out and executing software programs recorded in a storage medium such as a hard disk or semiconductor memory or the like.

The present disclosure may further be realized as a speech recognition method executed by the speech recognition apparatus or speech recognition system.

The numerals used in the above description are all exemplary, to make specific description of the present disclosure, and the present disclosure is not restricted to the exemplified numerals. Also, the division of functional blocks in the block diagrams are only exemplary, so multiple functional blocks may be realized as a single functional block, one functional block may be divided into multiple functional blocks, and part of the functions may be relocated to other functional blocks. Functions of multiple functional blocks having similar functions may be processed in parallel or time division by a single hardware or software configuration.

The order in which the steps are executed in the flowcharts are all exemplary, to make specific description of the present disclosure, and the present disclosure is not restricted to the above-described order. Part of the steps may be executed at the same time (in parallel) with other steps.

Although one or multiple forms of a speech recognition apparatus have been described based on embodiments, the present disclosure is not restricted to these embodiments. One skilled in the art will be capable of making various conceivable modifications and combinations of components among different embodiments without departing from the spirit and scope of the present disclosure; all such forms are also encompassed in the scope of the present disclosure.

The present disclosure is applicable to a speech recognition apparatus and speech recognition system, and for example is applicable to a speech conversation system.

What is claimed is:
1. A speech recognition method, comprising:
determining a first criteria value to detect a length of a first silent section included in a processing section;
detecting the first silent section, when a length of section without speech after an utterance is longer than or equal to the first criteria value;
determining a processing mode out of multiple processing modes for audio processing of which the processing amounts differ from each other, the multiple processing modes including (i) a first processing mode, which has a high processing amount and a high quality processing, and (ii) a second processing mode, which has a low processing amount and a low quality processing,
wherein, when the length of the first silent section is determined to be longer than or equal to a predetermined value, the processing mode being determined to be the first processing mode, and when the length of the first silence section is determined to be less than the predetermined value, the processing mode being determined to be the second processing mode;
obtaining audio information in the processing section including a section of interest and the first silent section following the section of interest, out of audio information in an input section including the processing section, using the first criteria value;

executing audio processing on the audio information in the section of interest, out of the audio information in the processing section, using the determined processing mode; and executing speech recognition processing on the audio information in the section of the interest where the audio processing has been performed.

2. The speech recognition method according to claim 1, wherein, in the obtaining of the audio information, audio information of the processing section is extracted from the audio information of the input section, by determining a point-in-time where the length of the silent section exceeds the first criteria value to be the end of the processing section.

3. The speech recognition method according to claim 1, wherein, in the executing of the audio processing, a silent section included in the section of interest is removed, and the audio processing is executed as to the audio information in the section of interest from which the silent section has been removed.

4. The speech recognition method according to claim 1, further comprising:

measuring processing time of the audio processing in the processing mode that has been determined; and changing the processing mode for audio processing based on the processing time that has been measured.

5. The speech recognition method according to claim 1, wherein the audio processing is noise suppression processing of the audio information, and wherein, in the determining of the processing mode, a noise suppression algorithm or a noise suppression parameter is determined as the processing mode.

6. The speech recognition method according to claim 1, further comprising:

transmitting audio information that has been subjected to encoding as the audio processing, to a speech recognition apparatus; and decoding the transmitted audio information at the speech recognition apparatus, wherein the audio processing is encoding processing of the audio information, wherein, in the determining of the processing mode, an encoding algorithm or an encoding parameter is determined as the processing mode, and wherein, in the executing of the speech recognition processing, the speech recognition apparatus executes the speech recognition processing on the decoded audio information.

7. The speech recognition method according to claim 1, wherein, in the determining of the processing mode, the processing mode to execute the audio processing is determined such that the audio processing will be executed on the audio information in the section of interest, during the time length of the processing section in the executing of the audio processing.

8. A speech recognition method, comprising:

determining a second criteria value to detect a length of a processing section and a third criteria value to detect a length of a section of interest;

detecting the processing section using the second criteria value;

detecting the section of interest using the third criteria value;

determining a processing mode out of multiple processing modes for audio processing of which the processing amounts differ from each other, the multiple processing modes including (i) a first processing mode, which has a high processing amount and a high quality processing, and (ii) a second processing mode, which has a low processing amount and a low quality processing, wherein, when a length of a first silent section that is the difference between the length of the processing section and the length of the section of interest is longer than or equal to a predetermined value, the processing mode being determined to be as the first processing mode, and when the length of the first silent section is less than the predetermined value, the processing mode being determined as the second processing mode;

obtaining audio information in the processing section including a section of interest and the first silent section following the section of interest, out of audio information in an input section including the processing section;

executing audio processing on the audio information in the section of interest, out of the audio information in the processing section, using the determined processing mode; and executing speech recognition processing on the audio information in the section of the interest where the audio processing has been performed.

9. A speech recognition apparatus, comprising:

a processor; and memory having a computer program stored thereon, the computer program causing the processor to execute operations according to claim 8.

10. A non-transitory recording medium having a computer program stored thereon, the computer program causing a processor to execute operations according to claim 8.

11. A speech recognition apparatus, comprising:

a processor; and memory having a computer program stored thereon, the computer program causing the processor to execute operations according to claim 1.

12. A non-transitory recording medium having a computer program stored thereon, the computer program causing a processor to execute operations according to claim 1.

* * * * *